United States Patent [19]
Adee

[11] 4,066,274
[45] Jan. 3, 1978

[54] TANDEM FOLDING IMPLEMENT

[75] Inventor: Raymond A. Adee, Newton, Kans.

[73] Assignee: Hesston Corporation, Hesston, Kans.

[21] Appl. No.: 709,880

[22] Filed: July 29, 1976

[51] Int. Cl.² .................... A01B 73/00; A01B 5/06
[52] U.S. Cl. .................... 280/411 A; 172/311;
172/581; 172/595; 280/656
[58] Field of Search ............ 172/311, 456, 568, 581,
172/649, 651, 662, 584, 586, 587, 595, 596;
280/411 R, 411 A, 411 B, 411 C, 412, 413, 656

[56] References Cited
U.S. PATENT DOCUMENTS

| | | | |
|---|---|---|---|
| 2,808,273 | 10/1957 | French | 280/412 |
| 3,493,248 | 2/1970 | Tasset | 280/411 A |
| 3,830,313 | 8/1974 | Frager et al. | 172/581 |
| 3,960,221 | 6/1976 | Blair et al. | 280/411 A X |

FOREIGN PATENT DOCUMENTS 215,295 5/1958 Australia .................... 280/411 C Primary Examiner—Richard T. Stouffer
Attorney, Agent, or Firm—Schmidt, Johnson, Hovey & Williams

[57] ABSTRACT

Tandemly disposed tool beams project laterally outwardly from opposite sides of the central tongue of the implement and may be swung horizontally between laterally widespread, working positions and folded back, compacted, transport positions. Collapsing linkages between the tongue and the front beams control swinging of the latter, while stiff links between the front and rear beams serve to maintain a selected angular relationship between the front and rear beams in the working and transport positions. Outer sections of the front linkages are extensible for adjusting the draft angle of the front beams, while the stiff links are likewise extensible for adjustment of the angle between the front and rear beams.

15 Claims, 4 Drawing Figures

TANDEM FOLDING IMPLEMENT

This invention relates to folding agricultural implements and, more particularly, to a tandem implement, such as a tandem disc harrow, wherein the front and rear gangs of discs may be folded from laterally widespread working positions to laterally compacted transport positions.

One important object of the present invention, therefore, is to provide a way of folding tandemly disposed tool beams horizontally into a compact condition to enable the machine to move along roads, through narrow gates and over confining bridges so as to avoid the problems inherent in vertically folding implements of this type including, for example, the need for powerful, complex and costly hydraulic systems for lifting the heavy beams into upright positions, and the ever present danger of interfering with overhead obstacles, such as tree limbs, power lines, building structures and bridge trusses.

Another important object of this invention is to accomplish the foregoing through a relatively uncomplicated arrangement of vertical pivots, links and linkages which maintains the beams firmly in a selected angular relationship to one another and to the tongue while in the working position and, yet, allows the beams to be readily folded into their transport positions for roading.

An additional important object of this invention is to provide a way of quickly and easily changing the draft angle of either the front or rear beams, or both.

The implement has a central, fore-and-aft extending tongue 10 provided with a hitch 12 at its forwardmost end for attachment to a towing vehicle (not shown). Hydraulically actuated ground wheels 14 support the tongue 10 for over-the-ground travel and may be raised and lowered relative to the tongue 10 for the purpose of varying the depth of the ground penetrating tools of the implement.

Figure 4:
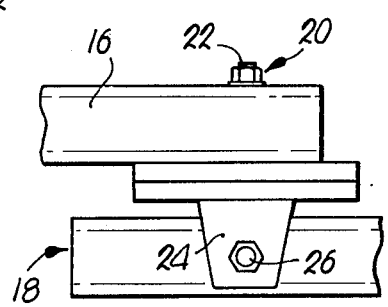
FIG. 4 is an enlarged, fragmentary detailed view of a typical pivotal mounting for the tool beams.

Approximately midway between the front and rear ends of the tongue 10, a pair of support arms 16 extend laterally outwardly from opposite sides of the tongue 10 and carry a pair of front tool beams 18, respectively. Each arm 16 supports its beam 18 through a connection 20 (illustrated in detail in FIG. 4), which includes a vertical pivot 22, a depending yoke 24 rotatable about the axis of the pivot 22, and a transverse pivot 26 between the yoke 24 and the beam 18. Accordingly, each beam 18 can swing horizontally about its vertical pivot 22 for folding or unfolding the implement, as well as vertically about its horizontal pivot 26 to accommodate changes in ground contour.

Each beam 18 is preferably jointed at mid-length such as to divide the same into a pair of end-to-end segments 28 and 30 interconnected by a hinge 32 for relative up-and-down swinging movement. Segments 28 and 30 have their own, forwardly disposed castor wheels 34 and 36, respectively, such that each segment 28 and 30 has a degree of individual responsiveness to ground contours. As illustrated by way of example, each beam 18 may carry a gang of discs 38 coaxially mounted beneath beam 18 for ground engagement.

Each beam 18 is also provided with its own individual folding control linkage 40 having a joint 42 intermediate the opposite ends thereof. An outer section 44 of each linkage 40 is connected at its outermost end to the outer segment 30 of the corresponding beam 18, such connection being made through a vertical pivot 46. On the other hand, an inner section 48 of each linkage 40 is connected at its inner end to the tongue 10 at a point just forwardly of the wheels 14 through a vertical pivot 50. By virtue of this arrangement, the linkages 40 permit the beams 18 to be folded rearwardly from their widespread positions of FIG. 1 to their compacted positions of FIG. 2, the linkages 40 unfolding from a partially collapsed condition against the tongue 10 toward a partially extending condition away from the latter during such rearward swinging of the beams 18. A suitable latch 52 on the tongue 10 adjacent hitch 12 may be used to releasably retain the linkages 40 against the tongue 10, if desired, such latch 52, for example, engaging the linkages 40 through apertures 54 in extensions of the inner sections 48 slightly beyond the joints 42, as illustrated best in FIG. 2.

Disposed in tandem relationship behind the front beams 18 is a second pair of tool beams 56, each of which is attached to the tongue 10 through a short, laterally projecting member 58 and a connection 60 of the same design as the connection 20 for the front beams 18. Accordingly, each connection 60 enables its beam 56 to swing horizontally about a vertical pivot 62, as well as vertically about a horizontal pivot (not shown) in the same manner as the front beams 18.

Also in the same manner as the front beams 18, the rear beams 56 are each medially jointed through a hinge 64 that permits vertical swinging of an inner segment 66 and an outer segment 68 of the beam 56. Each beam 56 may be provided with its own gang of discs 70 in the same manner as the beams 18, although the discs 70 are reversed with respect to the discs 38 so that, during operation, the discs 38 throw the soil outwardly while the discs 70 return the soil inwardly. Castor wheels 72 and 74 on the segments 66 and 68, respectively, support each beam 56 for over-the-ground travel, and it is to be understood that all castor wheels 34, 36 and 72, 74 are attached to their respective beams 18 and 56 in the well known manner for permitting raising and lowering of the beams 18 and 56 to vary the extent of ground penetration by discs 38 and 70.

A stiff link 76 extends between the front beam 18 and the rear beam 56 on each side of the tongue 10, respectively, and such links 76, cooperating with the linkages 40 and the latch 52, conjointly define what may be referred to as apparatus for controlling the angular relationships of the beams 18 and 56 with one another and with the tongue 10. A vertical pivot 78 at the front end of each link 76, respectively, connects the latter to the outer segment 30 of a beam 18, while a second vertical pivot 80 connects the rear end of each link 76, respectively, with the outer segment 68 of a beam 56. Preferably, each link 76 is so disposed and is of such a length that it maintains its two front and rear beams 18 and 56 in a laterally outwardly diverging relationship to one another when in the working position of FIG. 1.

Figure 2:
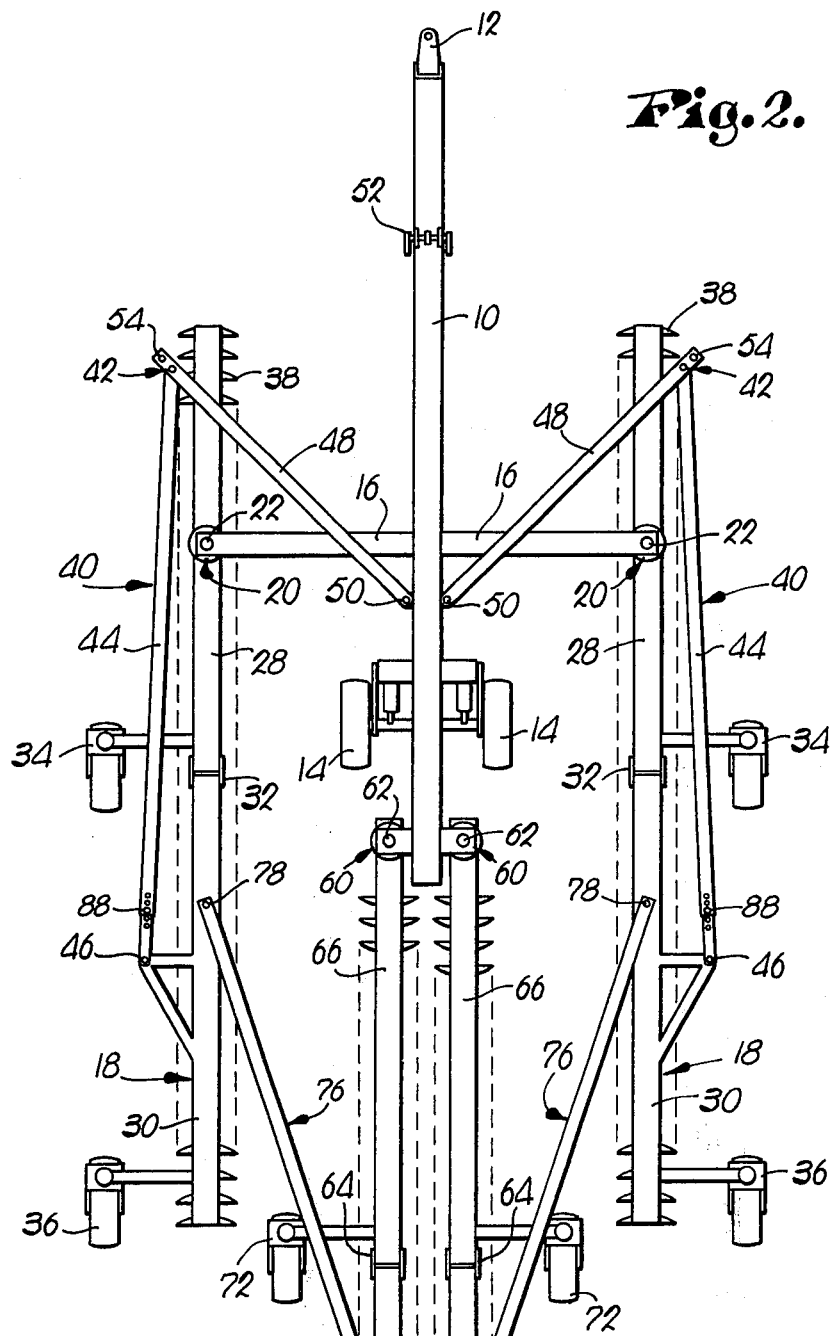
FIG. 2 is a plan view thereof with the beams folded rearwardly into their transport positions.

Moreover, such disposition of the links 76 is so selected that the beams 18 and 56 will fold back into substantial parallel alignment with one another and with the tongue 10 when in the transport position, as illustrated in FIG. 2. In this respect, the location of the pivots 78 and 80 along their respective beams 18 and 56 must be carefully selected in view of the fact that the front beams 18 swing rearwardly through more than 90' of travel while the rear beams 56 swing rearwardly through something considerably less than 90'.

Figure 3:
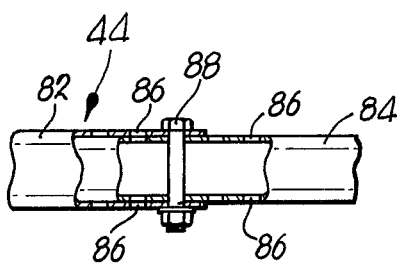
FIG. 3 is an enlarged, fragmentary detailed view, partially in cross-section, of a typical control link or linkage illustrating its telescopic capability for purposes of angle adjustment.

FIG. 3 illustrates in detail the way in which the linkages 40 and the links 76 may be made longitudinally extensible for the purpose of varying the draft angles of the beams 18 and 56. Although the outer section 44 of a linkage 40 is illustrated in FIG. 3, it will, of course, be understood that the principles therein illustrated and hereinafter described apply equally to the links 76.

Each outer section 44 comprises a pair of relatively telescoping members 82 and 84, the latter being received within the former. The members 82 and 84 are preferably tubular, and upper and lower openings 86 on the two members 82, 84 may be brought into vertical registration with one another for the purpose of receiving a connector 88 which may be in the form of a bolt. If desired, more than two of such bolts 88 may be utilized to make each connection inasmuch as, in many instances, more than two sets of the openings 86 will be in registration with one another.

In use it may be well to provide a bumper (not shown) between the two beams 56 for the purpose of limiting their travel toward one another in order to prevent damage thereto when in the transport position. Such bumper may be common to both of the beams 56, in which event it would be mounted on the rearmost end of the tongue 10, or, one or more individual bumpers can be provided on each beam 56, as may be necessary or desirable.

Figure 1:
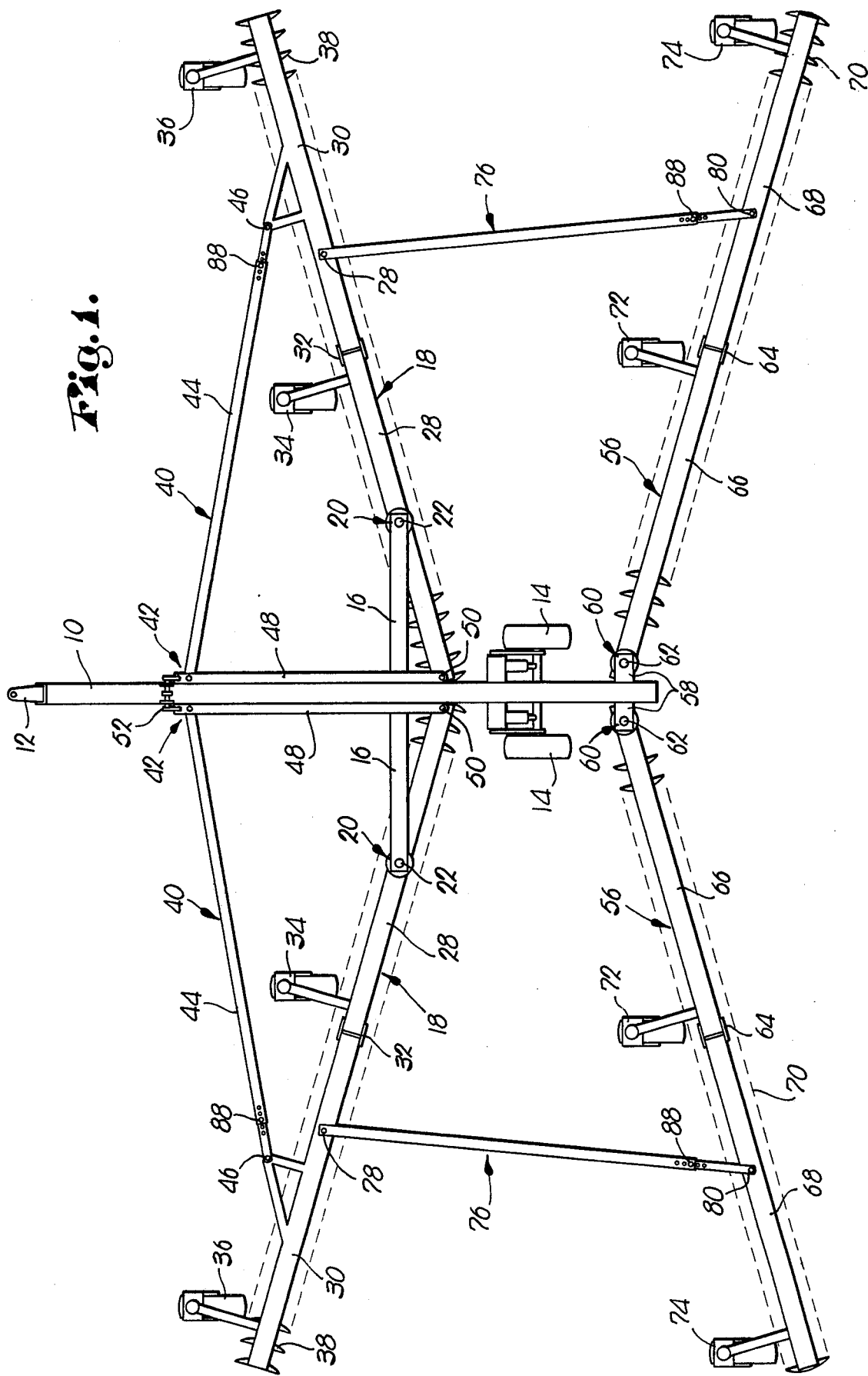
FIG. 1 is a top plan view of a tandem implement shown in its widespread working position and constructed in accordance with the principles of the present invention.

When the latch 52 retains the linkages 40, as illustrated in FIG. 1, the beams 18 and 56 are held in their widespread, operating positions, and the selected angular spacing between the front and rear beams 18 and 56 is maintained by virtue of the stiff links 76. When a field operation has been completed, the latch 52 may be released (such as by pulling on a rope, not shown, leading to the seat of the towing vehicle), whereupon continued forward movement of the tongue 10 causes the beams 18 and 56 to automatically fold back toward their transport positions of FIG. 2. Prior to such fold back, the discs 38 and 70 may be disengaged from the ground by raising the tongue 10 and beams 18, 56 through an appropriate hydraulic system coupled with the wheels 14 and the castor wheels 34, 36 and 72, 74, as above-discussed.

With the beams 18 and 56 folded back in this manner, the implement can be readily towed along the open road, through narrow gates and bridges with ease, and all without fear of striking any overhead obstacles, such as high voltage electric lines, overhanging trees, or bridge trusses. Note that, preferably, the pivots 20 for the front beams 18 are disposed substantially laterally outboard of the pivots 62 for the rear beams 56. This permits the beams 18 and 56 to swing freely without interference with one another between their respective working and transport positions. Note further that through the use of the castor wheels 34, 36 and 72, 74, the beams 18 and 56 readily swing into their transport positions inasmuch as the castor wheels 34, 36 and 72, 74 inherently seek a disposition in which their axes of rotation are transverse to the path of travel of the implement.

When the implement is to be unfolded from its transport position, it is only necessary to back the tongue 10 such as to urge the beams 18 and 56 outwardly from their parallel relationships to one another toward the diverging condition illustrated in FIG. 1. Note in this respect that if either of the beams 18 and 56 on one side of the tongue 10 resists such unfolding, this tendency will be overcome by the other in view of their positive interconnection through the link 76. This, then, assures complete unfolding to the working position without requiring that the operator step down from the vehicle and manually manipulate the beams 18 and 56. Once arriving in their working positions, the latch 52 may be replaced to firmly retain the widespread condition.

In the event that the operator may wish to vary the draft angle of the beams 18 and 56, such can be readily accomplished by virtue of the telescoping nature of the linkages 40 and the links 76. In this respect, note that it is only necessary to release and remove the appropriate bolts 88, telescope the members 82 and 84 in the appropriate direction and to the appropriate extent, and reinsert the bolts 88. If desired, of course, the front beams 18 alone may be adjusted while retaining the original angle between the latter and the rear beams 56. On the other hand, it may be necessary or desirable to adjust the draft angle not only of the front beams 18, but the rear beams 56 as well, and such can be readily accomplished.

Having thus described the invention, what is claimed as new and desired to be secured by Letters Patent is:

1. A tandem folding implement comprising:
   a central, fore-and-aft extending tongue;
   a first pair of tool-supporting beams projecting laterally from opposite sides of the tongue;
   a second pair of tool-supporting beams behind said first pair and projectng laterally from opposite sides of the tongue.
   said tongue and said beams being supported for over-the-ground travel in the direction of the longitudinal axis of the tongue;
   means mounting said beams for horizontal swinging movement between laterally widespread working positions and laterally compact, transport positions,
   each of said beams having its own upright axis about which said swinging movement of the beam occurs with each said upright axis being spaced apart horizontally from each other said upright axis; and
   control means coupled with said beams for maintaining the latter in preselected angular relationships with respect to one another and said tongue in said working and transport positions, respectively,
   said control means being coupled with said beams in such a manner that the two beams on each side of the tongue are constrained to move in the same direction during said swinging movement thereof about their axes.

2. A folding implement as claimed in claim 1, wherein said beams are adapted to swing rearwardly into the transport positions from said working positions.

3. A folding implement as claimed in claim 1, wherein said control means includes means for releasably retaining the beams in their working positions.

4. A folding implement as claimed in claim 1, wherein said control means includes a stiff link between the beams on each side of the tongue, respectively.

5. A folding implement as claimed in claim 4, wherein each link is disposed to maintain its beams in laterally outwardly diverging relationship to one another when in said working position and at least substantially in line with the path of travel of the implement when in said transport position.

6. A folding implement as claimed in claim 5, wherein the axes of swinging movement of one pair of the beams is disposed laterally outboard of the corresponding axes of the other pair of beams, said links each being disposed to maintain its beams substantially parallel to one another in said transport position.

7. A folding implement as claimed in claim 6, wherein said beams are adapted to swing rearwardly to said transport position from said working position.

8. A folding implement as claimed in claim 1, wherein said control means includes a folding linkage between the tongue and one beam on each side of the tongue, respectively, each linkage being swingable between a partially collapsed condition against the tongue when its beam is in the working position thereof and an extended condition away from the tongue when its beam is in the transport position thereof.

9. A folding implement as claimed in claim 8, wherein said linkages are disposed for rearward swinging of their beams from the working position to the transport position.

10. A folding implement as claimed in claim 8, wherein said control means further includes a stiff link between the beams on each side of the tongue, respectively.

11. A folding implement as claimed in claim 10, wherein said folding linkages are between the tongue and said first pair of beams.

12. A folding implement as claimed in claim 11, wherein the axes of swinging movement of said first beams are laterally outboard of the axes of swinging movement of said second beams, said linkages and said links being disposed to maintain the beams on each side of the tongue laterally outwardly diverging in said working position and substantially parallel with one another and the path of travel of the implement in said transport position.

13. A folding implement as claimed in claim 11, wherein said control means further includes means on the tongue and engageable with said linkages for releasably retaining the beams in said working position.

14. A folding implement as claimed in claim 10, wherein each of said linkages includes pivotally interconnected, laterally inner and outer sections, said outer section of each linkage being extensible for varying the angle at which the beams project from the tongue in the working position.

15. A folding implement as claimed in claim 14, wherein each of said links is extensible for varying the angle between the beams on each side of the tongue, respectively.

* * * * *

REEXAMINATION CERTIFICATE (659th)

United States Patent [19]

Adee

[11] B1 4,066,274

[45] Certificate Issued Mar. 31, 1987

[54] TANDEM FOLDING IMPLEMENT

[75] Inventor: Raymond A. Adee, Newton, Kans.

[73] Assignee: Hesston Corporation, Hesston, Kans.

Reexamination Request:
No. 90/000,903, Nov. 18, 1985

Reexamination Certificate for:
Patent No.: 4,066,274
Issued: Jan. 3, 1978
Appl. No.: 709,880
Filed: Jul. 29, 1976

[51] Int. Cl.$^4$ .................... A01B 5/06; A01B 73/00
[52] U.S. Cl. ............................. 280/411 A; 172/311; 172/581; 172/595; 280/656
[58] Field of Search ............... 172/311, 456, 568, 581, 172/584–598, 649–653, 662, 776; 280/411 R, 411 A, 411 B, 411 C, 412, 413, 656

[56] References Cited

U.S. PATENT DOCUMENTS

| | | | |
|---|---|---|---|
| 1,784,193 | 12/1930 | McOsker | 172/327 |
| 2,808,273 | 10/1957 | French | 280/412 |
| 3,960,221 | 6/1976 | Blair et al. | 172/311 |

FOREIGN PATENT DOCUMENTS 6836 of 1904 United Kingdom ............... 172/652

Primary Examiner—Richard T. Stouffer

[57] ABSTRACT

Tandemly disposed tool beams project laterally outwardly from opposite sides of the central tongue of the implement and may be swung horizontally between laterally widespread, working positions and folded back, compacted, transport positions. Collapsing linkages between the tongue and the front beams control swinging of the latter, while stiff links between the front and rear beams serve to maintain a selected angular relationship between the front and rear beams in the working and transport positions. Outer sections of the front linkages are extensible for adjusting the draft angle of the front beams, while the stiff links are likewise extensible for adjustment of the angle between the front and rear beams.

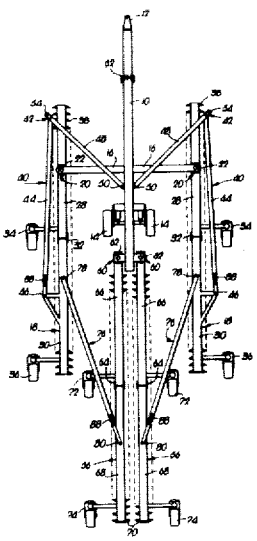

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 5-15 is confirmed.

Claims 1-4 are cancelled.

* * * * *